Nov. 8, 1955     L. H. DEUBLER     2,723,136
ROTATING UNION
Filed Sept. 13, 1952
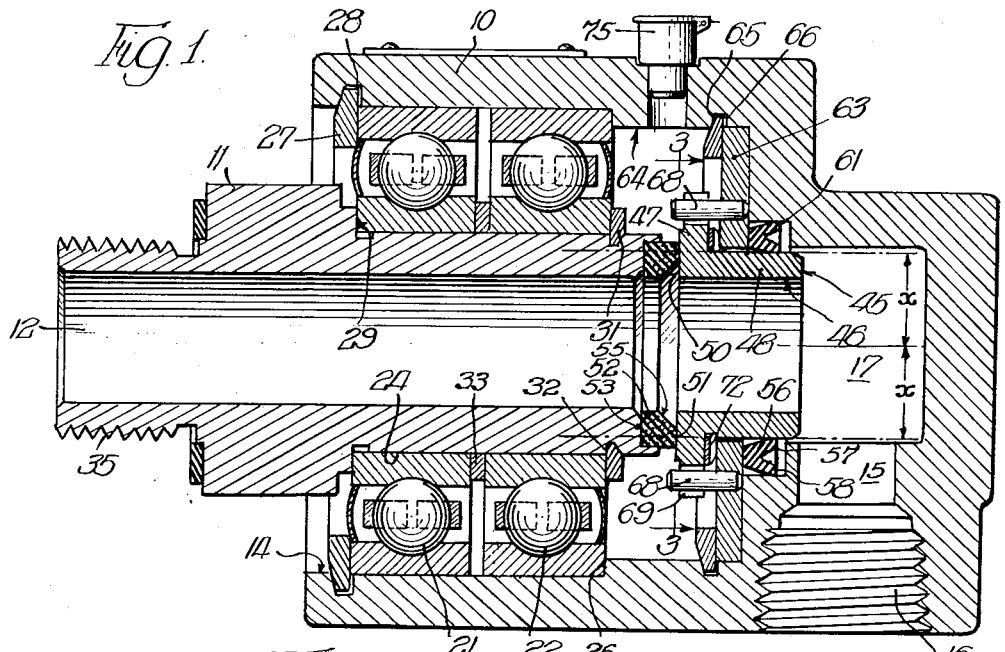
Inventors:
Louis H Deubler,
Richard L. Linn,
BY Maurice Thomas,

United States Patent Office 2,723,136
Patented Nov. 8, 1955

2,723,136

ROTATING UNION

Louis H. Deubler, Richard L. Linn, and Maurice Thomas, Northbrook, Ill., assignors to Deublin Company, Glenview, Ill., a corporation of Illinois Application September 13, 1952, Serial No. 309,414

2 Claims. (Cl. 285—97.3)

The present invention relates to rotating unions, and more particularly to fluid conducting rotating unions.

Many of the fluid conducting rotating unions of the prior art give satisfactory service when operated at low or moderate speeds, but encounter operating difficulties when operated at relatively high speeds, which produce overheating, rapid wear, etc. These relatively high speeds are exemplified by the speeds encountered in operating compressed air rotary chucks on lathes, air clutches, and the like, where the speeds may run as high as 3000 to 4000 R. P. M. and upwards.

Likewise, many of these fluid conducting rotating unions of the prior art give satisfactory service when conducting fluids of low or moderate pressures, but which are incapable of holding high pressures, or which encounter operating difficulties under high pressures, such as typical compressed-air shop-line pressures of 100 to 150 pounds per square inch.

The general object of the present invention is to provide an improved construction of fluid conducting rotating union which will give satisfactory service at these relatively high speeds and high pressures.

Another more specific object of the invention, contributing to this better performance, is to provide an improved construction and method of substantially balancing the fluid pressures within the rotating union. Balanced sealing means longer seal life, because the line pressures do not increase the load on the seal faces. This balanced sealing also means a substantially constant minimum starting and running torque of the rotary element of the union.

Another object of the invention is to make the rotary seal substantially leak proof by employing an improved relation of non-rotating slidable sealing block having a hardened and lapped tool steel end face which is spring pressed against a rotating lapped carbon sealing face carried by the end of the rotor. The improved design is such that if these sealing faces show signs of wear they can be easily replaced in a matter of minutes.

Another object of the invention is to provide an improved keying arrangement for holding the sealing block against rotation while still permitting it to slide freely under spring pressure.

Another object of the invention is to provide an improved arrangement of sealing ring encircling the slidable sealing block for establishing an improved pressure responsive sealing engagement therewith.

Another object of the invention is to provide an improved form and location of thrusting spring for imparting end thrust to the slidable sealing block, this spring being located posterior to the aforesaid sealing ring so that it does not become fouled and encrusted with sedimentation and deposits from the entering fluid.

Another specific object of the invention is to provide an improved construction of fluid conducting rotary seal of the above characteristics which will be relatively simple and inexpensive to construct, so that it can favorably compete, costwise, with other rotary seals on the market; and which can be quickly and easily assembled and disassembled, as by the extensive use of quickly releasable bevel retaining rings, so that the device can be easily cleaned and repaired.

Other objects, features and advantages of the invention will appear from the following detail description of certain preferred embodiments of the invention. In these drawings:

Figure 1 is an axial sectional view through one embodiment of our invention;

Figure 2 is a fragmentary view of the left hand end of this embodiment;

Figure 3 is a view of the sealing face end of the slidable sealing block, corresponding to a section taken on the plane of the line 3—3 of Figure 1;

Figure 4 is a transverse sectional view through the wave spring which transmits end thrust to the slidable sealing block;

Figure 5 is an axial sectional view through another embodiment of our invention; and Figure 6 is a transverse sectional view taken approximately on the plane of the line 6—6 of Figure 5.

Referring first to Figure 1, the main elements of such a rotary union comprise a stationary outer housing or stator 10 in which is rotatably journalled the rotor 11 having an axial fluid conducting passageway 12 extending therethrough. One end of the housing 10 has a large open-end bore 14 in which is mounted the rotor 11, and the other end of the housing is closed except for the right angle fluid passageway 15 which has a thread 16 in its outer end for connection with the fluid conduit, and which has its inner end opening into a reduced end bore 17 communicating with the fluid conducting passageway 12 in the rotor.

The tubular rotor spindle 11 is journalled in the large outer bore 14 on a pair of single row ball bearings 21 and 22. The outer races of these two ball bearings seat in the large bore 14, and the inner races fit over the reduced inner end 24 of the rotor spindle. End thrust acting on the outer races of the bearings is borne at one end of the bearing assembly by a shoulder 26 at the inner end of the large bore 14, and is borne at the other end of the bearing assembly by a snap ring 27 which snaps into an internal groove 28 formed at the outer end of the bore 14. End thrust acting on the inner races of the bearings is borne at one end of the bearing assembly by a shoulder 29 formed on the rotor spindle, and is borne at the other end of the bearing assembly by a snap ring 31 engaging in a groove 32 in the spindle. The inner races of the bearings are preferably spaced by a spacing washer 33. These anti-friction bearings are preferably of the sealed-for-life type, and the employment of two of these bearings of the single row type gives maximum rigidity to the rotor axis, which is desirable for maintaining a leak-proof joint at the end-face sealing surfaces.

In the illustrated embodiment, the projecting end of the tubular rotor 11 is shown as being provided with an external thread 35 of the standard or machine screw type for threading into the tapped bore of a rotating shaft, spindle, drum or other revolving element which is adapted to receive the compressed air, water or other fluid. It will be understood that this end of the spindle may be provided with a pipe thread, if desired, for screwing into a revolving pipe thread type of connection, or it may be provided with an internal thread, either of standard machine screw type or pipe thread type for screwing over an external thread on the revolving shaft, drum or the like. The stationary fluid connection is established, through the right angle passageway 15, as above described, and the threaded end thereof is shown as being provided with a pipe thread 16, but it will be understood that other types of threaded connections may be employed, and the supply connection 15, 16 might also be extended out in axial alignment with the rotor instead of being a right angle connection as shown. In a duo-flow type of rotary union having a condensate return pipe or the like extending axially through the rotor passageway 12, both the right angle connection and the axial end connection would be provided.

Communication is established between the end bore 17 and the fluid passageway 12 in the rotor through a slidable non-rotating sealing block 45 having an axial passageway 46 extending therethrough. This slidable sealing block 45 is preferably composed of hardened tool steel, and comprises an inner flange or head portion 47 and a reduced outer shank portion 48. The radially extending end face of the flanged head 47 constitutes the non-rotating end face 50 of the end face seal, the sealing block being preferably carburized and hardened, and the end face 50 being ground and lapped to very close tolerances. This non-rotating end face 50 is held in spring pressed abutment against the rotary end face 51 of the seal. Such rotating end face is formed on the inner end of a carbon sealing ring 52 carried in an annular recess or counterbore 53 formed in the inner end of the tubular rotor 11. The carbon ring is of relatively high density carbon, capable of holding relatively high air pressures, of approximately 150 pounds or more, without loss of pressure, the carbon identified as "Graphitar 39" being one typical example thereof. This carbon or graphite ring is adhesively secured to the rotor 11 and then flat lapped to a high degree of accuracy. We have found that such an end face seal 50—51 gives very satisfactory, long life service at speeds as high as 5000 to 6000 R. P. M. and at air or liquid pressures of 150 pounds or more. The manner of obtaining the substantially balanced relation of end pressures acting on the opposite ends of the slidable sealing block 45 will be hereinafter described after the description of the remainder of the structure.

Encircling the shank portion 48 of this slidable sealing block 45 is a sealing ring 56 preferably composed of neoprene, rubber or the like, and preferably in the form of a V-cut block having an inner lip 57 and an outer lip 58. This sealing ring is stationarily mounted in a groove or shallow counterbore 61 extending from the outer end of the bore 17. The sealing ring is held in place in this groove or counterbore by a holding or retaining ring 63 which seats in the bottom of another counterbore 64 extending forwardly from the counterbore 61 to the main bore 14. The action of the compressed air or other fluid pressure tends to expand the outer lip portion 58 of the sealing ring outwardly against the bottom of the counterbore 61, and tends to compress inner lip portion 57 inwardly around the shank 48 of the sealing block. The endwise movement of the sealing block is almost infinitesimal, such movement only occurring as wear occurs in the surfaces of the end-face seal 50—51.

The holding ring 63 is releasably locked in place by a snap ring 65 which snaps into an internal groove 66 formed in the counterbore 64. This snap ring 65 and the outer snap ring 27 are both preferably of the beveled section type which bind with a wedging grip when allowed to expand outwardly into their respective grooves 28 and 66. As shown in Figure 2, these rings have spaced ends provided with apertures a for receiving the pointed noses on the ends of special pliers used to insert and remove the rings, one typical embodiment thereof being referred to in the trade as "Truarc bevel retaining rings." The employment of these readily insertable and removable bevel retaining rings 27 and 65 greatly simplifies the operations of assembling and disassembling our rotating union, while also firmly locking the parts in place. The housing is thereby reduced to a one-piece casting without any bolts, screws or threaded connections, which further reduces the cost of the construction.

Referring again to the holding ring 63 which holds the sealing ring 56 in place, this holding ring also functions to hold the sealing block 45 against rotation. To this end, two pins 68 are anchored at diametrically opposite points in the ring 63 and project laterally therefrom to engage in two diametrically opposite notches 69 provided in the flanged head 47 of the sealing block 45. Thus, the sealing block is effectively held against rotation but is free to slide endwise. Some substantial clearance exists between the shank portion 48 of the sealing block and the central hole in the holding ring 63, so that the sealing block 45 is not confined to any position of axial alignment but has a substantial degree of lateral or alignment freedom for insuring that the two sealing surfaces 50 and 51 will remain in flatwise contact at all times.

These sealing surfaces are resiliently held in such contact by the action of a thrusting spring 72 which is confined between the holding ring 63 and the back side of the flanged head 47 on the sealing block. This spring is illustrated in Figure 4 from which it will be seen that it is a sinuated wave spring of very compact axial dimension. In view of the fact that the sliding movement of the sealing block 45 is almost infinitesimal, this wave type of spring is entirely practicable. It will be noted that this wave spring 72 is located at a point between the sealing ring 56 and the relatively rotating sealing surfaces 50—51, at which point it is entirely out of the path of flow of the water, compressed air, or other fluid. In the case of water and other liquids, there is a pronounced tendency for deposits of rust, sediment, dirt and the like to occur at various points in the path of liquid flow, particularly in spots like the end bore 17. Helical types of wire compression springs disposed in the end bore 17 frequently become so encrusted with accumulations of rust, sediment, dirt and the like that they are no longer effective to exert spring pressure against the slidable sealing block, with the resulting possibility of leakage. This has been entirely avoided in our improved construction by virtue of the wave spring 72 being isolated from the fluid flow.

A lubricating fitting 75 in the housing 10 serves to supply lubricant to the bore 64 for lubricating the parts.

Referring now to the balanced sealing feature of our invention, and more particularly the improved manner of obtaining the substantially balanced relation of end pressures acting on the opposite ends of the slidable sealing block 45, it will be seen that the engagement of the sealing ring 56 around the shank 48 of the sealing block limits the pressure responsive area at the right hand end of the sealing block to the outside radius of the shank 48, such outside radius or diameter being indicated at x in Figures 1 and 3. That is to say, this outside radius x of the shank 48 denotes the maximum radius of the pressure responsive area at the right hand end of the sealing block.

Referring now to the left hand or inner end of the sealing block 45, we have shown in Figure 3, between the two dotted concentric circles y and y', the circular contacting area of the end-face seal 50—51. That is to say, the smaller radius y denotes the inner or minimum radius of the area of contact between non-rotating sealing surface 50 and rotating sealing surface 51, and the larger radius y' denotes the outer or maximum radius of the area of contact between the two sealing surfaces 50 and 51. Inasmuch as the pressure responsive areas at opposite ends of the sealing block have the same effective inner radii, the condition of pressure balance or unbalance in the sealing block is determined by the relation or proportions of the other three radii x, y and y'. If radius x is smaller than the inner radius y, the pressure acting on the inner or sealing face end of the block will exceed that on the outer end and the pressure will tend to separate the seal. Conversely, if the radius x is substantially larger than the outer radius y', the pressure acting on the outer end of the block will substantially exceed that on the inner end, and the end-face seal will be responsive directly to pressure change, with the likelihood of running objectionably hot at high pressures. As a result of considerable experimentation and development of different designs of rotary unions, we have arrived at a substantially balanced construction predicated upon a distributed pressure drop or pressure differential occurring across the width of the annular contacting face of the seal; viz. a pressure drop occurring progressively from the inner radius of contact $y$ to the outer radius of contact $y'$. Improved results are obtained by proportioning the parts so that at least some of this pressure drop across the contacting face is balanced or opposed by a corresponding pressure area at the other end of the sealing block. For example, the parts are proportioned so that the outer radius $x$ of the shank 48 falls between the inner and outer radii $y$ and $y'$ of the seal contacting area, preferably at a point substantially midway between the inner radius $y$ and the outer radius $y'$, as shown in Figure 3. Thus, approximately half of the total pressure drop or pressure differential across the sealing surface is opposed by pressure area at the other end of the sealing block. We have found that such arrangement and proportions give a substantially balanced construction of rotary union which will not run hot under heavy fluid pressures, and conversely will not tend to separate at the end-face seal under heavy fluid pressures, and which does not require heavy spring pressure acting on the sealing block to maintain the union tight under widely different operating conditions.

The embodiment illustrated in Figures 5 and 6 follows quite closely the above described embodiment. However, the housing is made in two sections 10a and 10b secured together by cap screws 77. Accurately centered relation is maintained between these two housing sections by forming an axial counterbore 78 in the end-face of the end bell section 10b, and extending a centering flange 79 from the other housing section 10a into this counterbore 78. In this modified embodiment, the slidable sealing block 45' is shown as being of a carbon or graphite composition, substantially similar to the carbon sealing ring 52 of Figure 1. Thus, in this modified embodiment, the non-rotating sealing face 50' is composed of carbon and the rotating sealing face 51' is composed of steel, which is ground and lapped. The Neoprene sealing ring 56' is of the same construction and has the same sealing engagement over the shank portion 48' of the sealing block as above described. This ring is held in place by the holding ring 63' which is fixedly clamped in place between the bottom of the counterbore 78 and the flange 79. Thrusting pressure is maintained on the slidable sealing block 45' by a coiled compression spring 81 confined in the end bore 17. As shown in Figure 6, the sealing block is held against rotation with the rotary spindle by forming the block with diametrically opposite flat sides 82 on each side of the head portion 47', which flat sides engage corresponding flat side surfaces 83 formed in the extension bore 84 of the housing section 10a.

In this modified construction, the outer radius $x$ of the shank 48' has the same relation to the inner and outer radii $y$ and $y'$ of the sealing faces 50' and 51' as described above, in order to obtain the desired feature of balanced sealing.

While we have illustrated and described what we regard to be the preferred embodiments of our invention, nevertheless it will be understood that such are merely exemplary and that numerous modifications and rearrangements may be made therein without departing from the essence of the invention.

We claim:

1. In a fluid conducting rotary union of the class described, the combination of a one-piece non-rotating housing formed with a main bore at one end and a plurality of successively smaller counterbores extending inwardly therefrom, a non-rotating fluid conducting passageway entering the innermost of said counterbores, a pair of single row ball bearings mounted in said main bore, a rotor mounted in said ball bearings having a rotating fluid conducting passageway therein, a non-rotating tubular sealing block slidably mounted in said housing and adapted to establish communication between said non-rotating and said rotating fluid passageways, a carbon ring carried by said rotor and defining a rotating end-face carbon sealing surface on the inner end of said rotor, a metallic non-rotating end-face sealing surface on the adjacent end of said sealing block coacting with said rotating sealing surface, said sealing block comprising a cylindrical shank portion and a flanged head portion, said flanged head portion being formed with said metallic non-rotating sealing surface, a resilient sealing ring stationarily mounted in one of said counterbores and encircling said shank portion, said sealing ring comprising an outer lip adapted to be pressed outwardly by fluid pressure against the bottom of said counterbore and comprising an inner lip adapted to be pressed inwardly by fluid pressure against the outer surface of said shank portion, a holding ring mounted in another of said counterbores, a pair of diametrically opposite holding pins projecting from the face of said holding ring and engaging in peripheral notches in the flanged head portion of said sealing block for holding the latter against rotation while permitting endwise sliding movement thereof, a wave form of circular spring acting between said holding ring and said flanged head portion for holding said sealing surfaces together, a quickly releasable retaining ring for retaining said ball bearings in said main bore, and a quickly releasable retaining ring for retaining said holding ring in its respective counterbore.

2. In a fluid conducting rotary union of the class described, the combination of a one-piece non-rotating housing formed with a main bore at one end and counterbores extending inwardly therefrom, a non-rotating fluid conducting passageway entering one of said counterbores, a pair of single row ball bearings mounted in said main bore, a rotor member mounted in said ball bearings having a rotating fluid conducting passageway therein, a tubular sealing block member slidably mounted in said housing and abutting against the end of said rotor member to establish communication between said non-rotating and said rotating fluid passageways, one of said members comprising a carbon end-face sealing surface, the other of said members having a cooperating metallic end-face sealing surface having sealing abutment against said carbon end-face sealing surface in the form of a circular annulus of sealing contact having inner and outer radii of different lengths, said sealing block member comprising a cylindrical shank portion and a flanged head portion, said flanged head portion having openings therein a resilient sealing ring mounted in one of said counterbores and encircling said shank portion, said sealing ring comprising an outer lip facing toward the pressure end of the union so as to be pressed outwardly by fluid pressure against the cylindrical wall of said latter counterbore and comprising an inner lip also facing forward the pressure end of the union so as to be pressed inwardly by fluid pressure against the outer surface of said shank portion, a holding ring mounted in another of said counterbores, a beveled section snap ring engaging in a groove in said latter counterbore and binding said holding ring against rotation with a wedging grip, pin means projecting from said holding ring and engaging in said openings in the flanged head portion of said sealing block member for holding the latter against rotation while permitting endwise sliding movement thereof, a wave form of circular spring acting between said holding ring and said flanged head portion for holding said sealing surfaces together, and a quickly releasable retaining ring for retaining said ball bearings in said main bore, said cylindrical shank portion having an outer radius at the line of contact with said sealing ring which is larger than the inner radius of said circular annulus of sealing contact and smaller than the outer radius of said circular annulus of sealing contact.

References Cited in the file of this patent

UNITED STATES PATENTS

| | | |
|---|---|---|
| 2,010,930 | Rowe | Aug. 13, 1935 |
| 2,365,046 | Bottomley | Dec. 12, 1944 |
| 2,381,432 | Bratton | Aug. 7, 1945 |
| 2,390,892 | McCormack | Dec. 11, 1945 |
| 2,434,684 | Casperson | Jan. 20, 1948 |
| 2,445,062 | Goldberg | July 13, 1948 |
| 2,462,006 | Schmitter et al. | Feb. 15, 1949 |
| 2,518,216 | Barker | Aug. 8, 1950 |
| 2,587,170 | Klinger et al. | Feb. 26, 1952 |
| 2,653,041 | Wilson | Sept. 22, 1953 |

FOREIGN PATENTS

| | | |
|---|---|---|
| 894,783 | France | Mar. 20, 1944 |